United States Patent
McKnight et al.

(10) Patent No.: US 7,627,833 B2
(45) Date of Patent: Dec. 1, 2009

(54) SYSTEM AND METHOD FOR OBJECT-ORIENTED GRAPHICALLY INTEGRATED COMMAND SHELL

(75) Inventors: David McKnight, Newmarket (CA); Jeffrey Turnham, Markham (CA)

(73) Assignee: International Business Machines Corporation, Armonk, NY (US)

( * ) Notice: Subject to any disclaimer, the term of this patent is extended or adjusted under 35 U.S.C. 154(b) by 800 days.

(21) Appl. No.: 10/702,993

(22) Filed: Nov. 6, 2003

(65) Prior Publication Data

US 2004/0264782 A1 Dec. 30, 2004

(30) Foreign Application Priority Data

Jun. 26, 2003 (CA) .................................... 2433527

(51) Int. Cl.
*G06F 3/048* (2006.01)
(52) U.S. Cl. .................. 715/809; 715/780; 715/808; 715/810; 715/846; 715/847
(58) Field of Classification Search .......... 715/780, 715/809, 808, 744–747, 863–864, 810–847; 717/116; 382/181, 229; 345/156, 173–179
See application file for complete search history.

(56) References Cited

U.S. PATENT DOCUMENTS

| | | | | |
|---|---|---|---|---|
| 4,783,759 A | * | 11/1988 | Borgendale et al. | 715/809 |
| 4,885,717 A | * | 12/1989 | Beck et al. | 717/125 |
| 4,899,136 A | * | 2/1990 | Beard et al. | 345/156 |
| 5,065,347 A | * | 11/1991 | Pajak et al. | 715/835 |
| 5,179,702 A | * | 1/1993 | Spix et al. | 718/102 |
| 5,421,004 A | * | 5/1995 | Carpenter et al. | 714/25 |
| 5,557,730 A | * | 9/1996 | Frid-Nielsen | 715/839 |

(Continued)

FOREIGN PATENT DOCUMENTS

EP 0944007 2/1999

(Continued)

OTHER PUBLICATIONS

Microsoft, Microsoft Windows XP, screen printout pp. 1-17.*

(Continued)

*Primary Examiner*—Weilun Lo
*Assistant Examiner*—William Wong
(74) *Attorney, Agent, or Firm*—David A. Mims, Jr.; Amy J. Pattillo (57) ABSTRACT

A system and method for integrating command shell into a graphical user interface (GUI) in order to provide a single user interface (UI), so that a user need not work in different environments for different tasks are provided. An output response from the command shell is typically one or more lines of text from an output stream such as standard error or standard output. To accomplish the integration, a user is enabled to enter shell commands from the GUI. Output responses from the commands are interpreted to determine how to represent objects in the responses. The interpretation may be by pattern matching with regular expressions. If a shell command produces lines of command output, which when interpreted (e.g. indicating a file or folder), map to some other object model (e.g. a file subsystem) in the GUI, appropriate model objects (e.g., a file or folder icon) are created and rendered into the GUI as a response to the shell command.

15 Claims, 8 Drawing Sheets

U.S. PATENT DOCUMENTS

| | | | | |
|---|---|---|---|---|
| 5,579,469 | A * | 11/1996 | Pike | 715/781 |
| 5,602,997 | A * | 2/1997 | Carpenter et al. | 715/764 |
| 5,617,527 | A * | 4/1997 | Kressin et al. | 715/840 |
| 5,666,502 | A * | 9/1997 | Capps | 715/811 |
| 5,696,914 | A | 12/1997 | Nahaboo et al. | 345/333 |
| 5,764,983 | A * | 6/1998 | Chew et al. | 707/205 |
| 5,877,764 | A * | 3/1999 | Feitelson et al. | 715/808 |
| 5,953,720 | A * | 9/1999 | Mithal et al. | 707/10 |
| 6,091,896 | A * | 7/2000 | Curreri et al. | 717/125 |
| 6,131,183 | A * | 10/2000 | Tyler | 717/106 |
| 6,229,539 | B1 * | 5/2001 | Morcos et al. | 715/808 |
| 6,360,280 | B1 * | 3/2002 | Jones | 719/328 |
| 6,378,125 | B1 * | 4/2002 | Bates et al. | 717/129 |
| 6,484,190 | B1 * | 11/2002 | Cordes et al. | 715/514 |
| 6,724,409 | B1 * | 4/2004 | Maddocks et al. | 715/853 |
| 6,751,780 | B1 * | 6/2004 | Neff et al. | 715/247 |
| 2002/0199173 | A1 * | 12/2002 | Bowen | 717/129 |
| 2003/0106046 | A1 * | 6/2003 | Arnold et al. | 717/129 |
| 2003/0131325 | A1 * | 7/2003 | Schubert et al. | 716/4 |
| 2003/0184584 | A1 * | 10/2003 | Vachuska et al. | 345/762 |
| 2004/0153963 | A1 * | 8/2004 | Simpson et al. | 715/500.1 |
| 2005/0177567 | A1 * | 8/2005 | Hughes et al. | 707/5 |
| 2005/0187889 | A1 * | 8/2005 | Yasoshima | 707/1 |
| 2006/0048074 | A1 * | 3/2006 | Klein | 715/811 |
| 2007/0157115 | A1 * | 7/2007 | Peters | 715/808 |

FOREIGN PATENT DOCUMENTS

| | | |
|---|---|---|
| JP | 5224903 | 2/1992 |
| JP | 10269066 | 3/1997 |

OTHER PUBLICATIONS

Jennifer Fulton, "Sams Teaching Yourself Windows 98 in 10 minutes", May 14, 1998, Sams Publishing, Lesson 5 (printout pp. 1-4) and Lession 10 (printout pp. 1-2).*

Christopher Zacharias, "Use Address Bar as a Command Line", Sep. 8, 1999, http://www.microsoft.com/technet/prodtechnol/Windows2000Pro/tips/addbar.mspx, printout pp. 1-3.*

Microsoft, Microsoft Windows XP, screen printout figures 18-21.*

Wikipedia, "Standard streams", http://en.wikipedia.org/wiki/Standard_streams, printout pp. 1-6.*

Bier, EA.; "Embedded Buttons: Documents as User Interfaces", Nov. 1991.

Lehrbaum, R.; "Focus on Embedded Systems—A Survey of Embedded Linux Packages", 2003.

IBM TDB: "Graphical User Interface for the Distributed Computing Environment", vol. 38, No. 1, Jan. 1995.

Tilevich, E.; "J-Orchestra automatic Java application partitioning", ECOOP 2002—Object Oriented Programming. 16$^{th}$ European Conference, vol. 2374, pp. 178-204.

Leber, JF., "An interactive object-oriented neural network simulator applied to the recognition of acoustical signals", IEEE 1992, Cat. No. 92CH3139-3, vol. 6, pp. 2937-3940.

Goalby, J.; "Scripts for Windows", Dr. Dobb's J., vol. 224, No. 1, Jan 1999, p. 86, 88-92.

* cited by examiner

SYSTEM AND METHOD FOR OBJECT-ORIENTED GRAPHICALLY INTEGRATED COMMAND SHELL

TECHNICAL FIELD

This system and method are related to the field of user interfaces and more particularly to a command language interface to an operating system such as a shell.

BACKGROUND

User interfaces provide a connection between a software program and a human user, enabling the user to operate the software, receive results of the operation, or both. A command line shell (CS) is a traditional operating system (OS) interface for commanding an OS with text-based keyboard entered commands within a 'command prompt'. A user using a CS can run programs, launch batch commands or shell procedures, and perform system administration, for example. Output is also text-based and usually terse.

Today, most operating systems provide a graphical user interface (GUI) for commanding applications. Applications may use the supplied GUI and add elements for operating the application. GUIs often employ one or more appropriate visual metaphors for objects and are considered to be more user-friendly. Each of the text-based and graphics-based interfaces has its own advantages and disadvantages. For example, a CS is a powerful interface having the advantage that virtually any software tool can be written to work in the CS environment. Further, CS is an interface allowing an advanced user to perform complex commands quickly and efficiently. On the other hand, a CS is not a user friendly environment because it is not an intuitive environment and therefore requires the user to work in a non-visual world where knowledge of commands and their exact syntax is required in order to operate it effectively.

A GUI, which is currently the most popular type of interface, provides a more intuitive environment where each command or tool can be visually represented such as by an icon, menu or form. Because GUIs display information visually, they are able to provide information in such a way that concepts that apply to the physical world are reused in the computer environment. Real-world paradigms like putting things in places visually support commands and translate to commands into drag and drop operations. This visual support makes the GUI much more intuitive than a CS for typical users and thus makes it a more user friendly environment.

Although there are many GUI frameworks that allow tools to reuse common user interface components, there is no single generic graphical tool that can be used for the same variety of tool domains such as in the CS environment. While there may be GUIs that perform the same things that a command line tool performs, the GUIs reside in different products that are typically incompatible with each other.

Due to these two types of user interfaces, users utilize one or the other depending on the task. For example, a software developer might work in a command shell to run compile commands, whereas he/she would likely work with a GUI to debug a program. With modern integrated development environments (IDEs), the goal is to integrate all the tools that a developer needs to work with into a single GUI so that the developer does not need to work in different environments for different tasks. For example, rather than using one GUI to edit a file and another to debug the same file, both tools can exist in one application.

Acknowledging that the flexibility of the command shell is a necessary part of many development processes, many IDEs attempt to integrate the command shell. The usual way that command shells are integrated into IDEs is very limited. This approach has been to introduce a GUI view that allows a user to input text-based commands to standard input to the shell and see standard output and error from the shell in text form. In most cases, a text view that looks very much like a shell console is used as a display. The end result amounts to having a shell console inside a GUI rather than having it in a separate window. As a result, there is very little integration between the shell view and the rest of the GUI. Graphical views provide object visualization, actions to work against those objects, as well as drag and drop support within and across views, while the shell view does not.

A solution to some or all of these shortcomings is therefore desired.

SUMMARY

The present invention is directed to a system and method for an object-oriented graphically integrated command shell.

In accordance with an aspect the invention, a method is provided for use in a computer system adapted to provide an object-oriented graphical user interface (GUI) for an application, said application GUI using one or more application model objects for modeling information and a mechanism to render and manipulate the application model objects. The method is for integrating to said application GUI a command shell of a program for executing commands and providing text-based output generated in response to the executing. The method comprises: defining a command shell GUI model comprising command shell model objects for modeling information in said command shell, said command shell model objects comprising at least one of the application model objects; mapping text-based output of said command shell generated in response to a command to instances of said command shell model objects; and rendering and manipulating the instances of the command shell model objects. In accordance with the invention, any instances of said application model objects are rendered and manipulated in accordance with the application GUI.

In accordance with a feature of this aspect, the step of mapping comprises: interpreting the text-based output; and creating instances of said command shell model objects in response to said interpreting, where text-based output comprising information modeled by the application GUI being mapped to an instance of the application model object therefor. The step of interpreting the text-based output may comprise pattern matching said text-based output with patterns, each pattern being associated with a one of said context shell model objects. The step of creating instances may comprise analyzing the command and selecting the command shell model objects to create in response to said analyzing. In a particular manner for this feature, the step of analyzing may comprise atleast one of determining a current working directory associated with the command and determining a command type for the command; and wherein said creating instances is responsive to at least one of the current working directory and the command type.

In accordance with another feature, the step of mapping may comprise listening to one or more output streams of the program to receive the text-based output.

In accordance with another feature, the step of mapping comprises receiving a text-based user input of a command and providing the command to an input stream of the program to execute the command.

In accordance with another feature, the step of rendering and manipulating comprises, for each instance of the command shell model objects mapped in response to the command: obtaining an icon representing the instance of the command shell model object and the text-based output mapped thereto; and displaying the icon and text.

In accordance with another feature, the step of rendering and manipulating comprises: receiving a user interaction to manipulate a selected rendered instance of a model object; determining candidate actions for the selected instance, said candidate actions inherited from said application GUI for instances of the application model object; and rendering candidate actions to the user for invocation. The method may also comprise invoking a selected one of said candidate actions in response to a further user interaction.

In accordance with a further aspect of the invention, there is provided for use in a computer system adapted to provide an object-oriented graphical user interface (GUI) for an application, said application GUI using one or more application model objects for modeling information and a mechanism to render and manipulate the application model objects, a computer program product having a computer readable medium tangibly embodying computer executable code to integrate to said application GUI a command shell of a program for executing commands and providing text-based output generated in response to the executing. The computer program product comprises code for defining a command shell GUI model comprising command shell model objects for modeling information in said command shell, said command shell model objects comprising at least one of the application model objects; code for mapping text-based output of said command shell generated in response to a command to instances of said command shell model objects; and code for rendering and manipulating the instances of the command shell model objects, any instances of said application model objects being rendered and manipulated in accordance with the application GUI.

In accordance with another aspect of the invention, there is provided for use in a computer system adapted to provide an object-oriented graphical user interface (GUI) for an application, said application GUI using one or more application model objects for modeling information and a mechanism to render and manipulate the application model objects, a system to integrate to said application GUI a command shell of a program for executing commands and providing text-based output generated in response to the executing. The system comprises a command shell GUI model comprising command shell model objects for modeling information in said command shell, said command shell model objects comprising at least one of the application model objects; a mechanism for mapping text-based output of said command shell generated in response to a command to instances of said command shell model objects; and a mechanism for rendering and manipulating the instances of the command shell model objects, any instances of said application model objects being rendered and manipulated in accordance with the application GUI.

BRIEF DESCRIPTION OF THE DRAWINGS

Further features and advantages of aspects of the present invention will become apparent from the following detailed description, taken in combination with the appended drawings, in which.

It will be noted that throughout the appended drawings, like features are identified by like reference numerals.

DETAILED DESCRIPTION

The following detailed description of the embodiments of the present invention does not limit the implementation of the invention to any particular computer programming language. The present invention may be implemented in any computer programming language provided that the OS (Operating System) provides the facilities that may support the requirements of the present invention. A preferred embodiment is implemented in JAVA™ computer programming language (or other computer programming languages in conjunction with JAVA™). Any limitations presented would be a result of a particular type of operating system, data processing system, or computer programming language, and thus would not be a limitation of the present invention.

Figure 1:
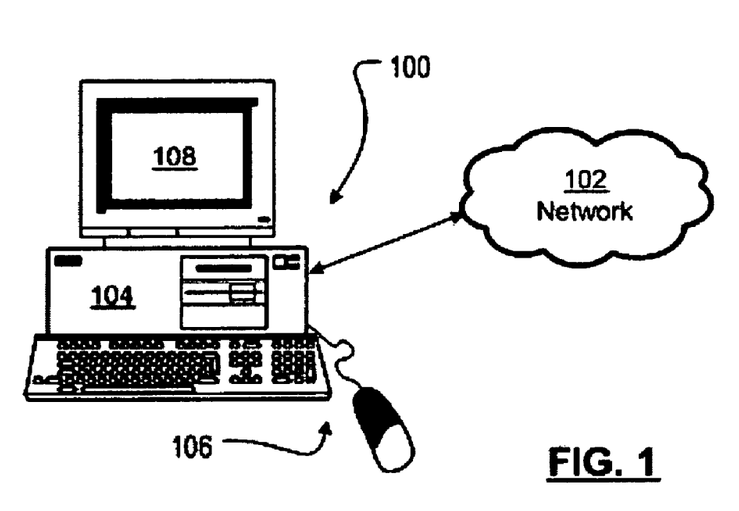
FIG. 1 schematically illustrates a computer system embodying aspects of the invention.

An embodiment of the invention, computer system 100, is illustrated in FIG. 1. A computer system 100, which is illustrated for exemplary purposes as a computing device, is adapted to communicate with other computing devices (not shown) using network 102. As will be appreciated by those of ordinary skill in the art, network 102 may be embodied using conventional networking technologies and may include one or more of the following: local networks, wide area networks, intranets, the Internet, and the like.

Through the description herein, an embodiment of the invention is illustrated with aspects of the invention embodied solely on computer system 100. Aspects of the invention may be distributed amongst one or more networked computing devices which interact with computer system 100 using one or more networks such as, for example, network 102. However, for ease of understanding, aspects of the invention have been embodied in a single computing device—computer system 100.

Computing device 100 typically includes a processing system 104 which is enabled to communicate with the network 102, and various input devices 106 and output devices 108. Input devices 106 (a keyboard and a mouse are shown) may also include a scanner, an imaging system (e.g., a camera, etc.), or the like. Similarly, output devices 108 (only a display is illustrated) may also include printers and the like. Additionally, combination input/output (I/O) devices may also be in communication with processing system 104. Examples of conventional I/O devices (not shown in FIG. 1) include removable recordable media (e.g., floppy disk drives, tape drives, compact disk (CD) drives, digital video disk (DVD) drives, etc.), touch screen displays, and the like.

Figure 2:
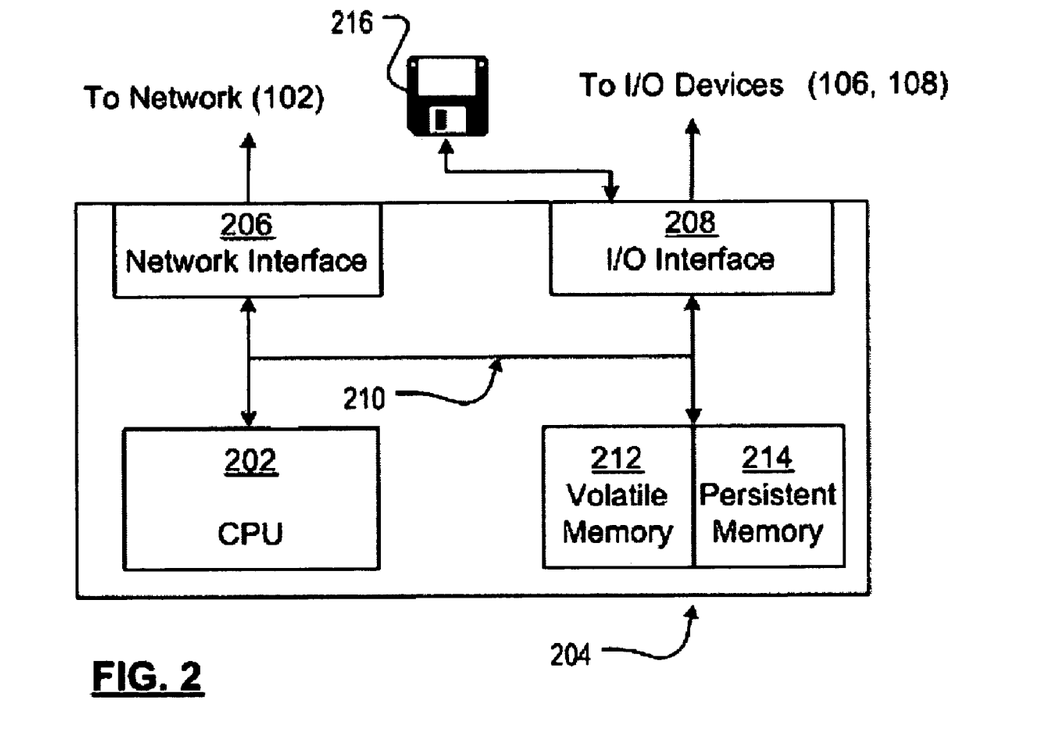
FIG. 2 schematically illustrates, in greater detail, a portion of the computer system of FIG. 1.

Exemplary processing system 104 is illustrated in greater details in FIG. 2. As illustrated, processing system 104 includes: a central processing unit (CPU) 202, memory 204, network interface (I/F) 206 and input-output interface (I/O I/F) 208. Communication between various components of the processing system 104 may be facilitated via a suitable communications bus 210 as required.

CPU 202 is a processing unit, such as an Intel Pentium™, IBM PowerPC™, Sun Microsystems UltraSparc™ processor, or the like, suitable for the operations described herein. As will be appreciated by those of ordinary skill in the art, other embodiments of processing system 104 could use alternative CPUs and may include embodiments in which two or more CPUs are employed (not shown). CPU 202 may include various support circuits to enable communication between itself and the other components of the processing system 104.

Memory 204 includes both volatile memory 212 and persistent memory 214 for the storage of: operational instructions for execution by CPU 202, data registers, application and thread storage, and the like. Memory 204 preferably includes a combination of random access memory (RAM), read only memory (ROM) and persistent memory such as that provided by a hard disk drive, flash memory, or both.

Network I/F 206 enables communication between other computing device 100 and other network computing devices (not shown) via network 102. Network I/F 206 may be embodied in one or more conventional communication devices. Examples of a conventional communication device include: an Ethernet card, a token ring card, a modem, or the like. Network I/F 206 may also enable the retrieval or transmission of instructions for execution by CPU 202, from or to a remote storage media or device via network 102.

I/O I/F 208 enables communication between processing system 104 and the various I/O devices 106 and 108. I/O I/F 208 may include, for example, a video card for interfacing with an external display such as output device 108. Additionally, I/O I/F 208 may enable communication between processing system 104 and a removable media 216. Removable media 216 may comprise a conventional diskette or other removable memory devices such as Zip™ drives, flash cards, CD-ROMs, static memory devices and, the like. Removable media 216 may be used to provide instructions for execution by CPU 202 or as a removable data storage device.

Figure 3:
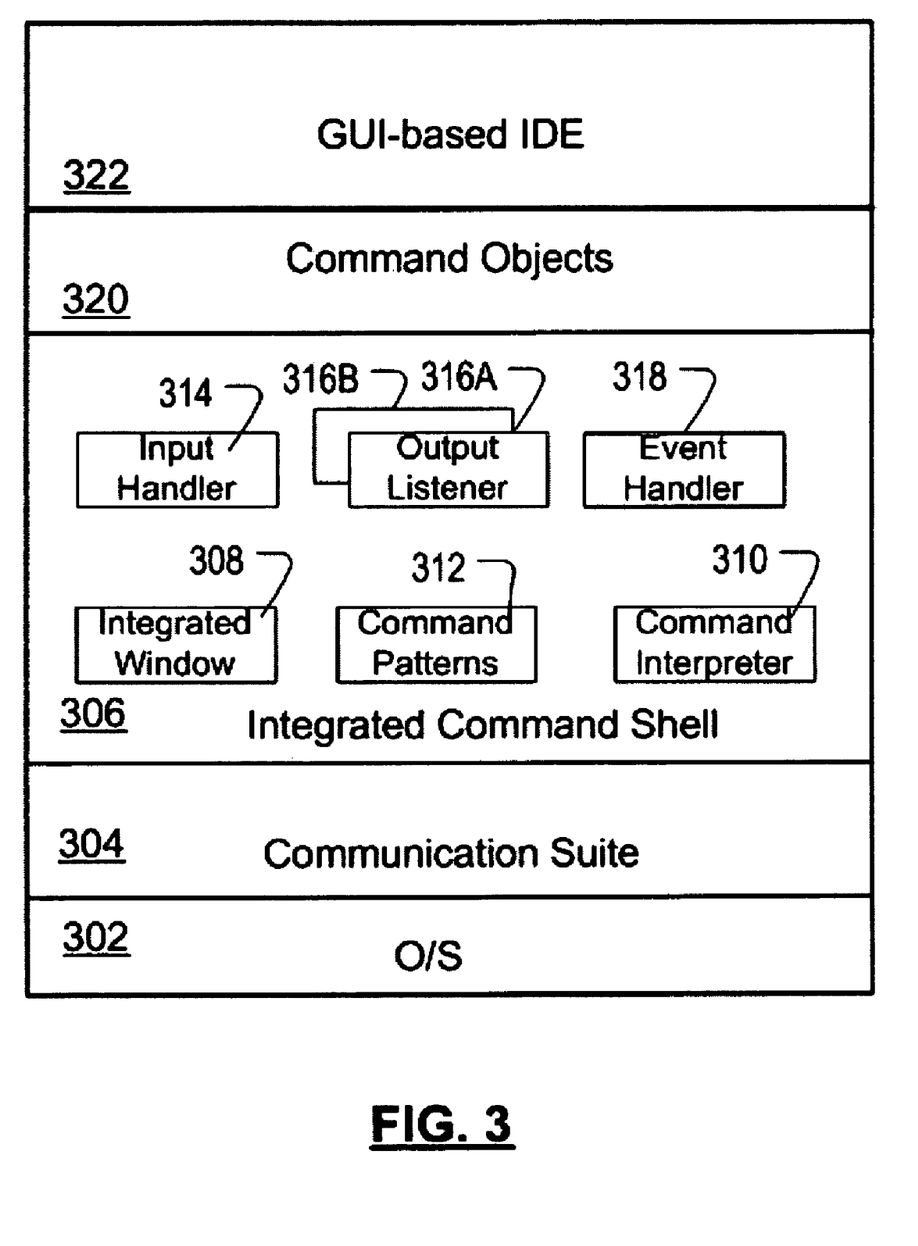
FIG. 3 is a functional block illustration showing a portion of the memory illustrated in FIG. 2.

Computer instructions/applications stored in memory 204 and executed by CPU 202 (thus adapting the operation of the computer system 100 as described herein) are illustrated in functional block form in FIG. 3. As will be appreciated by those of ordinary skill in the art, the discrimination between aspects of the applications illustrated as functional blocks in FIG. 3 is somewhat arbitrary in that the various operations attributed to a particular application as described herein may, in an alternative embodiment, be subsumed by another application.

As illustrated for exemplary purposes only, memory 204 stores instructions and data for enabling the operation of the object-oriented graphical integrated command shell: an operating system (OS) 302, a communication suite 304, and an object-oriented graphical integrated command shell (ICS) 306. ICS 306 comprises GUI window graphics 308, a command interpreter 310 with command patterns 312, command input handler 314, output listeners 316A and 316B, collectively 316, and event handler 318. Further illustrated are command objects 320 for use with ICS 306. Also shown is a GUI-based integrated development environment (IDE) 322 well known to persons of ordinary skill in the art of software development and to which ICS 306 may be integrated in accordance with the invention.

OS 302 is an operating system suitable for operation with a selected CPU 202 and the operations described herein. Multi-tasking, multi-threaded OSes such as, for example, Microsoft Windows 2000.TM., UNIX.TM. or other UNIX-like OSes such as IBM AIX.TM., Linux.TM., etc. are expected to be preferred in many embodiments. Communication suite 306 provides, through interaction with OS 302 and network I/F 206 (FIG. 2), suitable communication protocols to enable communication with other networked computing devices via network 102 (FIG. 1). Communication suite 306 may include one or more of such protocols such as Transmission Control Protocol/Internet Protocol (TCP/IP), Ethernet, token ring and the like. Communication suite 304 preferably includes asynchronous transport communication capabilities for communicating with other computing devices.

ICS 306 is a software application executable in the environment of OS 302 in order to provide a command interface to a human user for OS 302. The user using ICS 306 can instruct the execution of specific commands of OS 302, and view the responses to such commands. Commands can be run in the environment of OS 302 or can be run on other computer systems adapted to communicate with computer system 100 using the network 102. Objects in ICS 306 may be dragged and dropped into views of IDE 322.

In accordance with the invention, ICS 306 is adapted to integrate a command shell (CS) into a GUI environment (e.g. as provided by IDE 322) in order to provide a single graphical user interface, so that the user does not need to work in different environments for different tasks. To accomplish the integration, ICS 306 provides interpretation of command input and output responses that occur as result of processing commands entered by a human user (not shown). An output response, which is typically one or more lines of text representing a standard error response or a standard output, is parsed by ICS 306 in order to determine a meaning of such a response. This meaning may be determined by pattern matching the symbols of the text line to the command patterns 312.

In the preferred embodiment of the invention, in order to better interpret output responses and provide complete paths to files and folders, ICS 306 determines the properties of the current working directory at any point in time, the invocation of the current command that is being run, and the lexical patterns within any particular line of output.

For example, when a user issues a "dir" or "ls" command in a UNIX or UNIX-like OS environment, at least some of the lines of shell output represent files and folders. When a user issues a "grep" command, the lines of shell output represent search results. When a user instructs the OS to compile a file, the output may represent compile errors and warnings. Depending on what information the GUI models, some types of output may have special significance, in that there is an opportunity for lines of output to correspond to other objects in the user interface. For example, if the GUI application has a model and views to represent file system information, then text-based shell output that represents file system information is significant, and ICS 306 provides a manner to integrate the two. If the GUI application is designed to allow developers to fix program errors, then shell output that represents compile errors is significant in the same way.

Using knowledge of command invocation, ICS 306 is able to determine which types of output responses to expect and thus is capable of interpreting output for a particular command. By being able to decode certain patterns in lines of output responses, ICS 306 maps each line to a particular object type. Using knowledge of the working directory, ICS 306 is further able to determine exactly what file or folder might be associated with a particular output object.

By way of example, in accordance with the invention, when an ICS shell is opened in a current working director d:\examples, ICS 306 determines the current working directory. If a user runs a "dir" command, ICS interprets the input command using input handler 314, command interpreter 310 and command pattern 312 to determine the expected output of the command, i.e. that it will match appropriate output patterns for a directory listing, namely files and folders. ICS further interprets the output using output listeners 316, command interpreter 310 and command patterns 312, on a line by line basis, comparing the text to the patterns for a directory command. If a line of output matches the pattern for a file or folder, an output object 320 is created to represent the file or folder. The file name is determined using the pattern and, together with the current working directory, a fully qualified file or folder name is determined. This full name is used as the unique key for the object 320. ICS 306 does not fully interpret the input command in the same way that the command output is interpreted. Instead, ICS 306 simply determine the type input command sufficiently to select the list of output patterns required for interpreting the output of that particular input command.

The interpreter 310 can be implemented using a number of methods well known in the prior art. In the exemplary embodiment of the invention, a method of regular expression pattern matching is used. The interpreted output from the shell is used to connect shell information to application tools using a general UI model. The model consists of a type of object representing the shell (or a command) and output from the command. A shell object may contain multiple output objects.

The output objects from a shell can be generic output objects that are representations of output for which no existing UI object model exists, for example, if the output does not map to a file. Also, in some instances the shell may contain non-generic objects such as files or folders to which the output maps.

For example, after running a "dir" command in directory or folder d:\examples containing myfile.c, a line of the interpreted text output maps to the file "d:\examples\myfile.c". Using the file name as a key, it can be determined if the UI model has an object that maps to the same key. If such an object exists, the shell object can be populated with the existing UI model object instead of a generic output object.

By using the existing UI model object, the UI features and properties of that object can be inherited. For example, if that object has actions or drag and drop support associated with it, they become available.

In order to employ these features in the UI, some level of commonality between the UI views and the UI models is used. Preferably the shell view is a structured viewer, for example, using a table, tree, or table-tree viewer widget. With such a viewer, the view input is the shell object where each row in the viewer then maps to a single line output object. The benefit of using such a viewer is that because each line is clearly distinguished from each other different view icons and context-menu actions can be used for each output object. The methods used to display labels, icons and actions for the shell view are common to those used in other views. As a consequence, the methods used to display labels, icons and actions for a particular object are also common across objects. What this then allows is arbitrary model objects in the shell view, and the UI functionality that goes with them.

Figure 4:
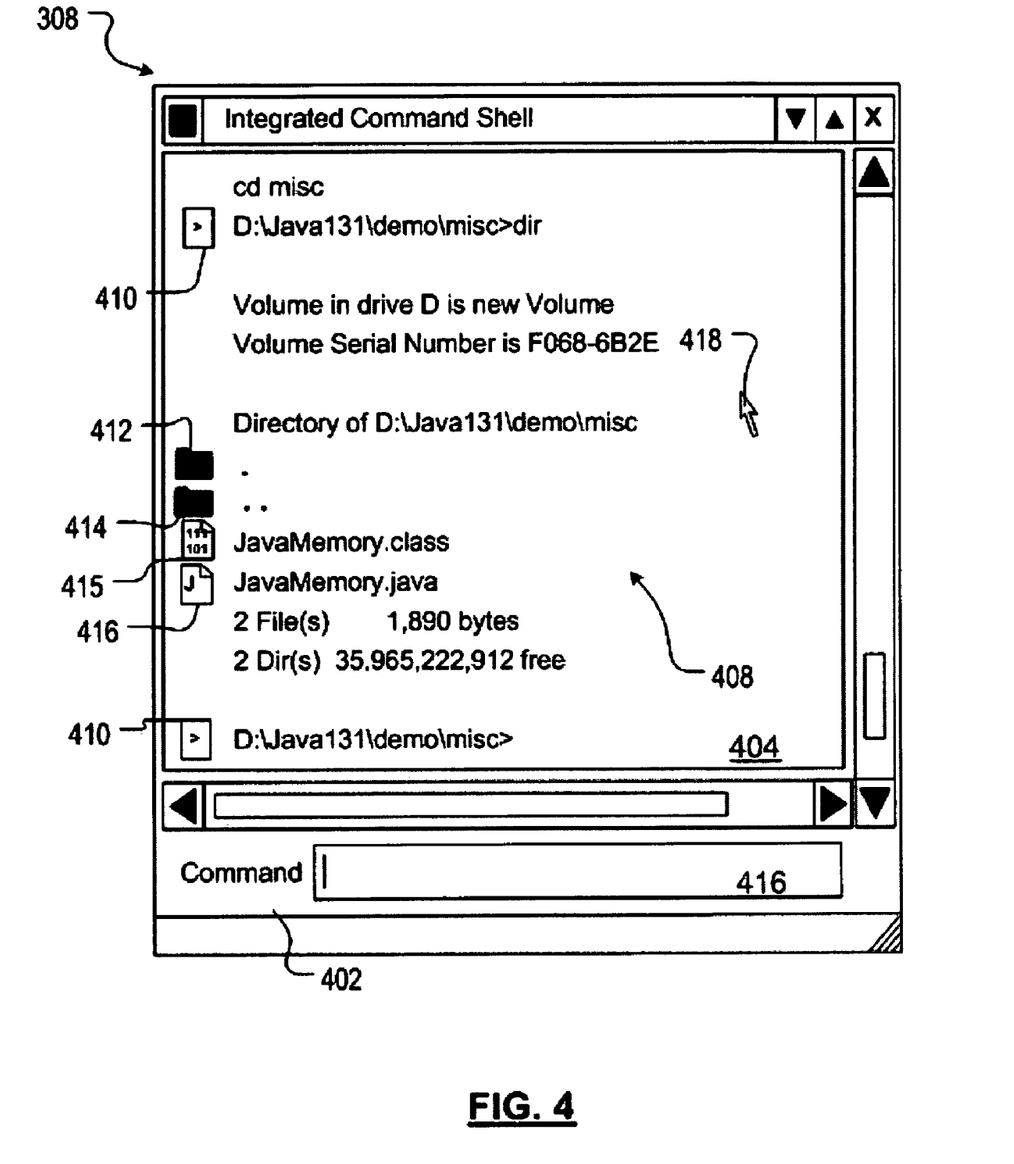
FIG. 4 schematically illustrates an exemplary structure of an integrated window illustrated in FIG. 3.

FIG. 4 is a schematic illustration of an exemplary structure of ICS window 308. The window 308 comprises a command pane 402 and an output pane 404. The command pane 402 representing the above mentioned CS comprises a command line 406 wherein a user can type a command which will be processed on the "Enter" key. The command is sent to a command subsystem (not shown) of the OS 302 for further execution. After processing the command, the command subsystem outputs a response which appears in the output pane 404. Lines of text 408 illustrate the entered commands and their respective output responses. As is described above, lines of the output 408 are interpreted and mapped to objects. Some of the mapped objects are associated with specific classes of objects that currently exist in the computer system 100, for example, those associated with a file subsystem. Some successfully interpreted objects are marked by icons 410, 412, 414, 415 and 416 that are enabled to interact with a pointer 418 controllable by an input device 106 such as a mouse, keyboard, or other pointing devices adapted to control a pointer 418 such as tracking balls, touch screens, pointing sticks, digitizers etc. Some objects may be associated with a set of specific operations that can be applied to the object. The operations that can be applied to the objects may be displayed by using a menu accessible by right-clicking the mouse, for example, when the pointer is pointing to the object. Other methods such as using a menu bar or drag-and-drop can be implemented to operate and manage the objects. These methods are well known to a person skilled in the art.

Figure 5:
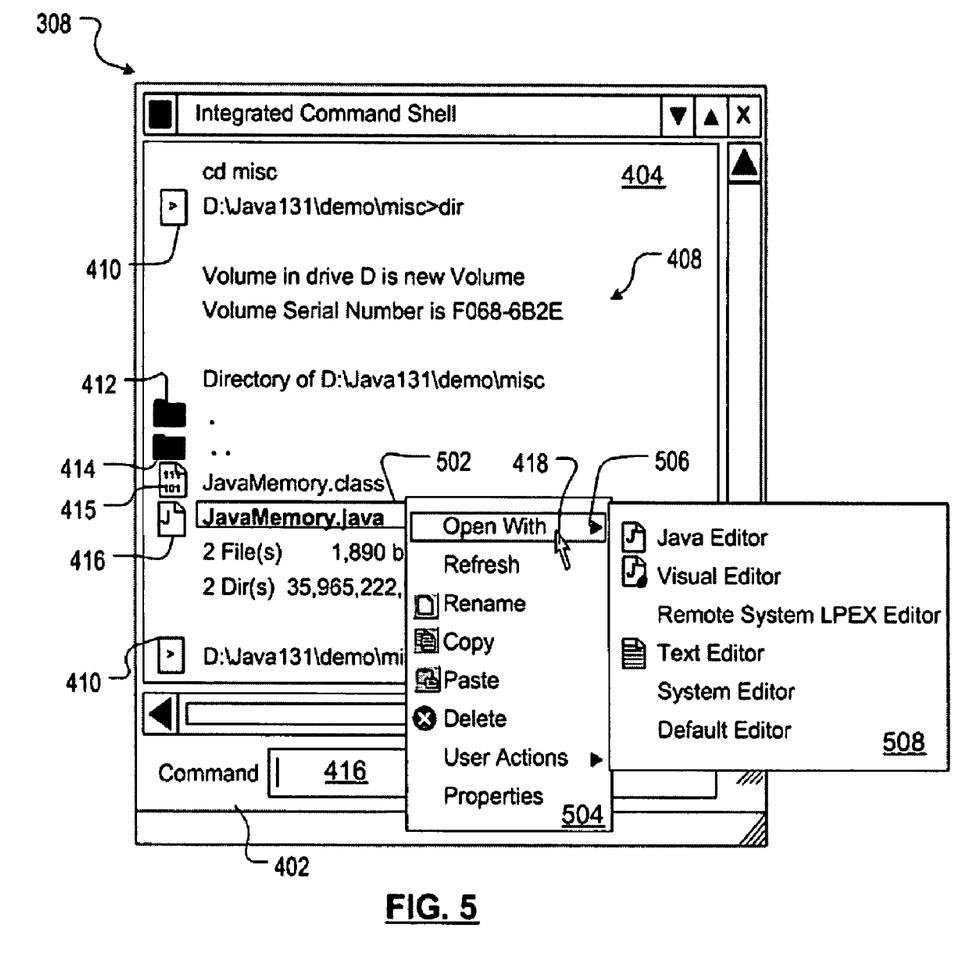
FIG. 5 is a schematic illustration of an exemplary structure of an integrated window having a selected object that is associated with a set of specific operations.

FIG. 5 is a schematic illustration of an exemplary structure of an integrated window 308 having a selected object associated with a set of specific operations. The ICS 306 enabling the standard graphic interface (GUI) provides a feature of highlighting (selecting) interpreted objects within the integrated window 308. When an exemplary object, "JavaMemory.java" 502, is highlighted, a selection of several actions or operations may be accessed using a pop-up menu 504 displayed in response to user interaction such as by right-clicking a mouse 418 pointing on an icon (e.g. 416). Some operations of the pop-up menu 504, such as "Open with" 506, can be performed using a submenu menu 508 that is associated with specific operations of the selected object "JavaMemory.java" 502.

Figure 6:
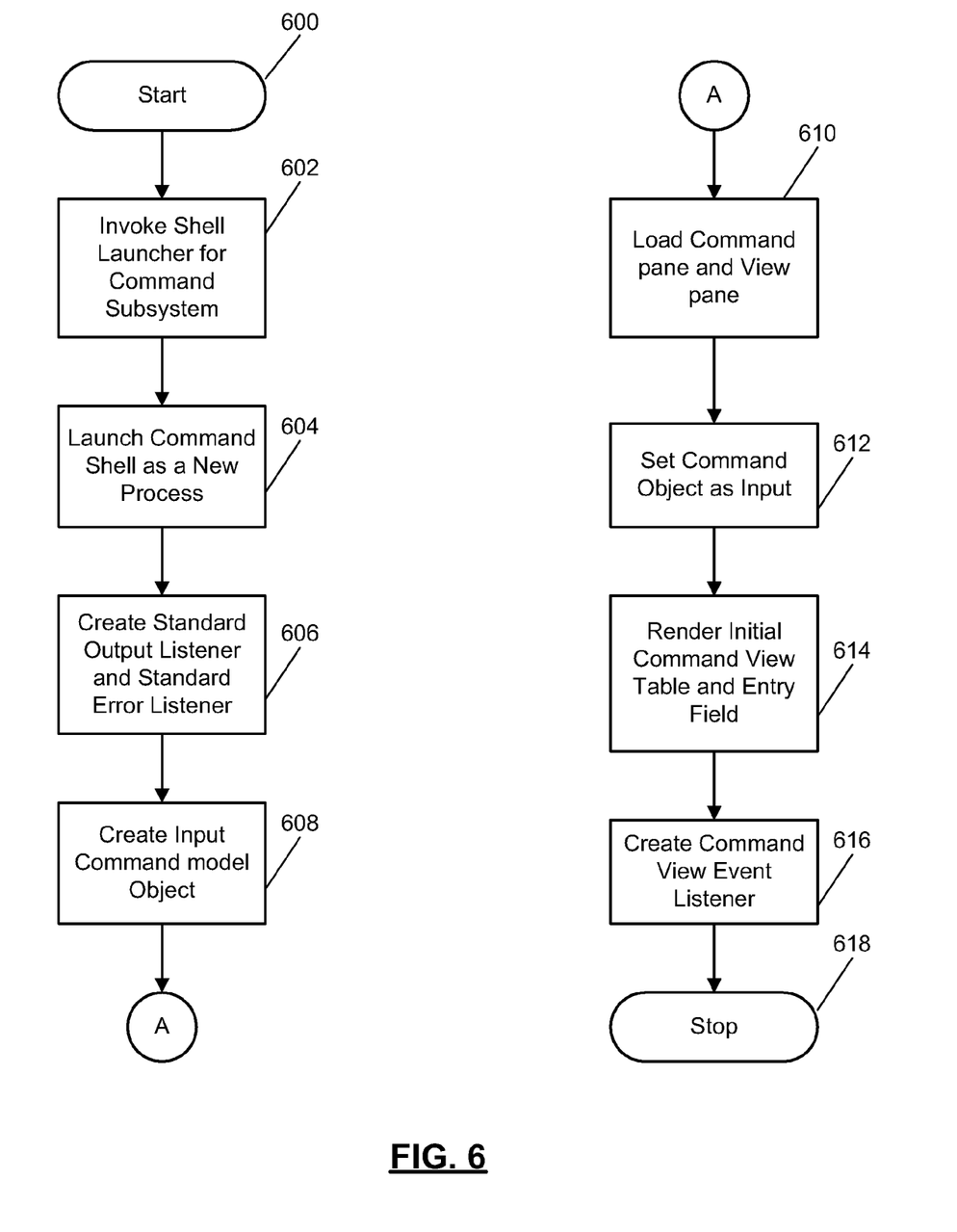
FIG. 6 is a flowchart illustrating operational steps involved in lunching an integrated command shell (ICS)

FIG. 6 is a flowchart illustrating the basic operational steps involved in launching ICS 306. In accordance with the exemplary embodiment, to start ICS 306, several processes are launched in the OS 302 environment. On startup (Step 600) of ICS 306, a shell launcher (not shown) for the command subsystem is invoked (Step 602). Then ICS 306 can be launched as a new process. In order to process outputs from the command subsystem, a standard output listener 316A and a standard error listener 316B are started (Step 606) as two respective threads of output listener 316. An input command model object 320 is then created for storing information associated with a command (Step 608). An input command model object 320 provides data storage and methods to manipulate information for a command and typically comprises some command object information such as the text of the command, command type and other attributes, and methods for getting and setting the command object information. A command view (not shown), which is responsible for integrated window 308, is then loaded (Step 610). After the input command object is set as an input object (Step 612), the integrated window including an output pane 404 and command pane 406 is rendered on the output device 108, such as a monitor of computer system 100. An input handler 314 is then created to monitor the input of commands in the command line 406 (Step 616). ICS 306 is thus launched (Step 618) and is able to process commands entered by a user.

Figure 7:
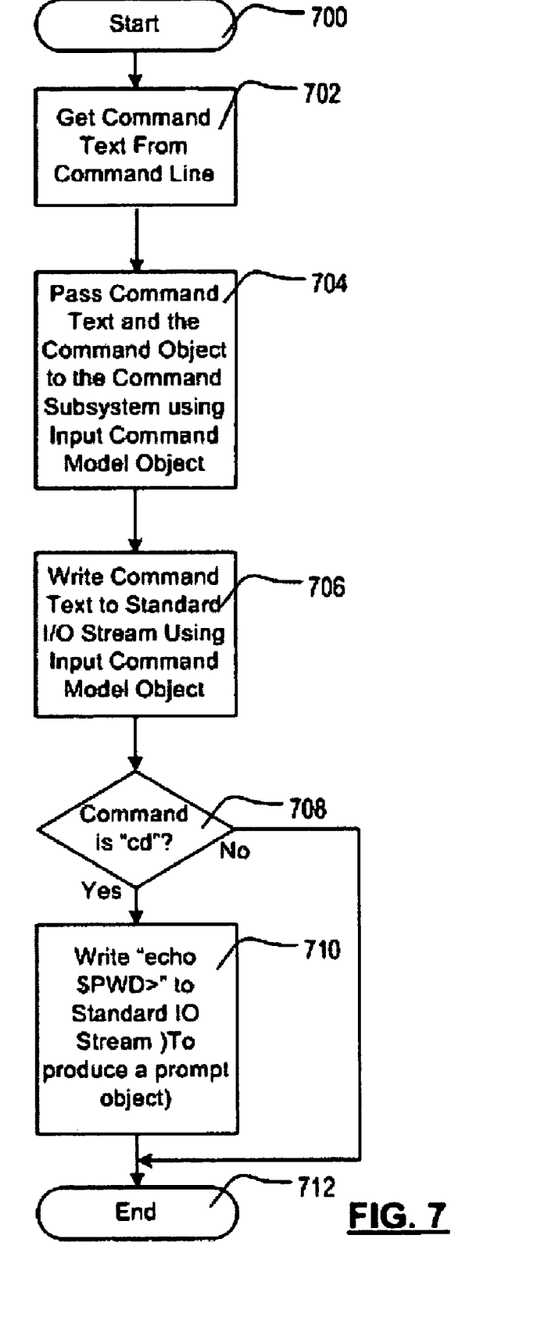
FIG. 7 is a flowchart illustrating operational steps involved in sending a command via the ICS to the CS.

FIG. 7 is a flowchart illustrating operations involved in processing input to ICS 306. After ICS 306 has been launched (Step 700), input handler 314 upon receiving entered command text in the command line 408 (Step 702) and next passes the command text to the command subsystem using the input command object (Step 704). The command text is then written to a standard input (I) stream for processing by OS 302. Optionally, if the command is a change directory command (Step 708), a command to echo the current working directory path (e.g. "echo $PWD>") is written to the standard input stream in order to produce a response including the current directory. Processing of the command is thereby completed (Step 712). In this example, the current working directory can be maintained efficiently for determining complete file paths by ICS 306. If the command is not a "change directory" command, the processing of the command is also completed (Step 712).

Figure 8:
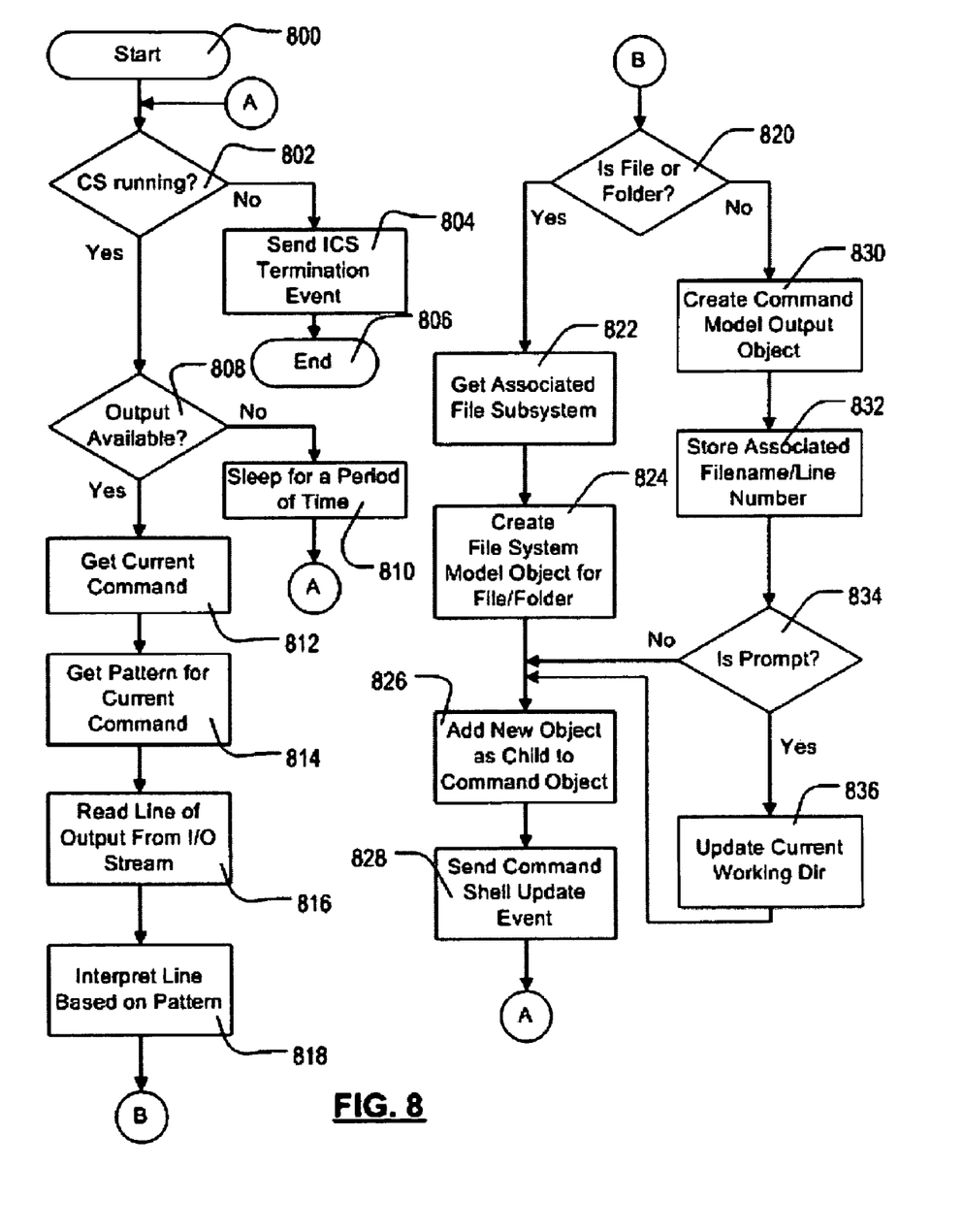
FIG. 8 is a flowchart illustrating operational steps involved in listening to standard output and standard error output of the command subsystem of an operating system (OS) by a respective standard output listener and a standard error output listener.

FIG. 8 is a flowchart illustrating operations involved in listening to standard output and standard error output of the command subsystem of the OS 302 using respective threads of output listener 316. As is described above, the command subsystem in response to the received command processes the command and outputs a text-based response on one or more output streams, for example, either standard output or standard error. The command subsystem uses the I/O streams as an interface for exchanging information between the ICS 306 and the OS 302. Typically, the I/O streams are used to facilitate character-oriented and line-oriented input or output.

After the standard output listener 316A and standard error listener 316B are started (Step 800), each listener periodically checks whether the command shell is still running (Step 802). If the command shell is not running, the listener terminates itself (Step 804) and the process of listening is ended (Step 806). If the command shell is operable and is still running, the respective output listener obtains the current content of the output stream it is monitoring to check whether output is available on the I/O stream. If there is no output in the stream (Step 808), the listener sleeps for a predetermined period of time (Step 810) and then again checks whether the command shell is still running (Step 802). If the listener identifies that there is output in the stream (Step 808), the listener retrieves the text of the current command (Step 812) that was most recently processed by ICS 306 and interprets the text to determine which command was issued (Step 814). In the exemplary embodiment, interpretation by interpreter 310 is performed using pattern matching techniques and command pattern data 312. Determining the command provides valuable assistance to interpreting and manipulating the output to produce one or more objects. The listener then retrieves a line from the output of the I/O stream (Step 816) and interprets the line (Step 818) using patterns for the command type, in order to identify or classify the type of output and to map each line to a particular object type. For examples in a UNIX-based environment, if the current command is a "dir" or "ls" command, the lines of output represent files and folders; if the current command is a "grep" command, the lines of output represent search results; if a current command is a command to compile a file, the output may represent errors and warnings.

Each line of output gets stored in memory as a line object. Each line object has the following attributes: line text, type attribute, file attribute, line number attribute (and optionally column number attribute). The type attribute is determined by the type of the pattern that a line of text matches. If there is no match, then type is just considered either "stdout" or "stderr", depending on which listener reads the text. When interpreting a line of output, if a pattern indicates that a portion of the output text maps to a file, that portion of text is extracted from the line of text and stored as a file attribute. Similarly, if the pattern indicates that a line number and optionally a column number exist in the output line, the line number and column number attributes get stored. For any line object that has a file attribute, the current working directory is used to qualify the stored file path. The qualified path of the file is used to produce the appropriate file system model object for files and folders. For objects that are not files or folders, such as errors or grep results, the file attribute is used when a user tries to open the corresponding file in an editor (in this case, a file system model object is created on demand to be used for opening the file in an editor). Each line object is associated as a child of the command object.

If the output line may be classified as a file type (e.g. a file or folder) (Step 820), the listener retrieves file subsystem information (Step 822), which is associated with the file/folder, and creates a file system model object for the file/folder (Step 824). This object is then added as a new child object to the command object (Step 826), the listener sends a command shell update event to ICS 306 (Step 828) described further below with reference to FIG. 9. The listener then proceeds to check whether the command shell is running (Step 802).

If the output line may not be classified as a file or folder (Step 820), a generic command model output object for representing output is created (Step 830). Information concerning a file name or line number associated with the current command or line of output determined by the pattern marking may then be stored (Step 832) to the output object. If the output line is a directory prompt (Step 834), the current working directory is updated (Step 836). The command model output object is added as a new child object to the command object (Step 826), and the listener sends a command shell update event to ICS 306 (Step 828) for handling by event handler 318.

Figure 9:
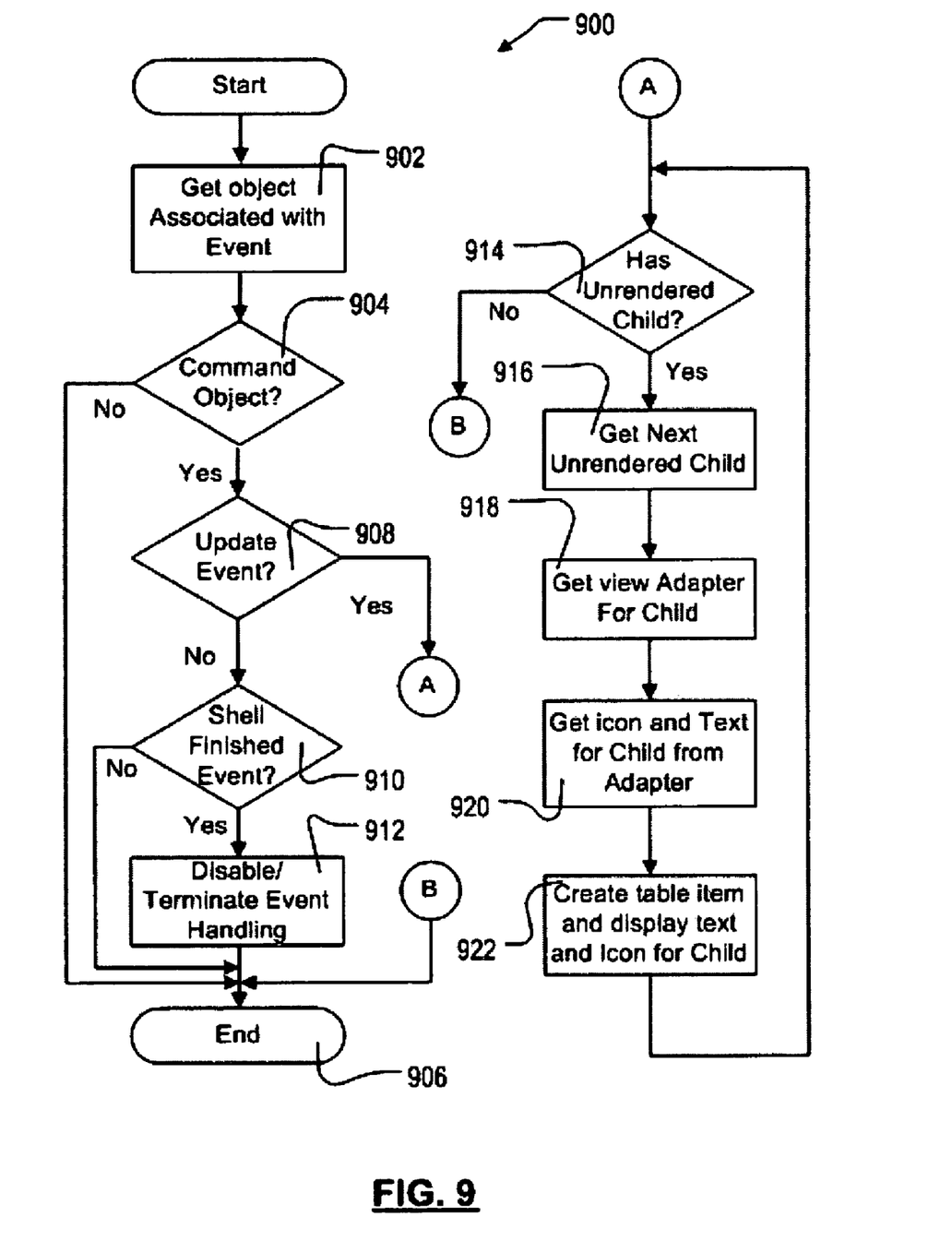
FIG. 9 is a flowchart illustrating operational steps involved in event handling by a ICS.

FIG. 9 is a flowchart illustrating operations 900 involved in event handling by event handler 318. On receiving an event, event handler 318 obtains the object associated with the event (Step 902). If the object is not a command object 320 (Step 902), processing of the event is revoked (Step 906). If the event has an associated command object 320, the event handler 318 determines whether the event is an update event for the view (Step 908). If not, then the event handler 318 determines whether it is a termination event for ICS 306 (Step 910). If the event is a termination of ICS 306, the event handler terminates ICS 306 (Step 912) and processing of the event is ended (Step 906). If the event is not a termination event for ICS 306, event handler 318 ends processing of the event (Step 906).

If at step 908, event handler 318 identifies that the event is an update event, processing operates to render the command object and each of its children. At step 914, event handler 318 identifies whether all child objects have been rendered. Each of the child objects represents a specific object for a line of output for integrated window 308. If all child objects are rendered, event handler 318 ends the event processing (Step 906). If a child remains to be rendered, event handler 318 selects the next unrendered child object (Step 916) and obtains a view adapter (not shown) for the child object (Step 918). Event handler 318 then obtains an icon and text associated with the child object using the adapter (Step 920) and creates a table item within pane 404 of the integrated window 308 and updates the display (Step 922). On completion of the processing of the selected child object, event handler 318 loops to determine whether there are unrendered child objects or not (Step 914) as discussed.

Figure 10:
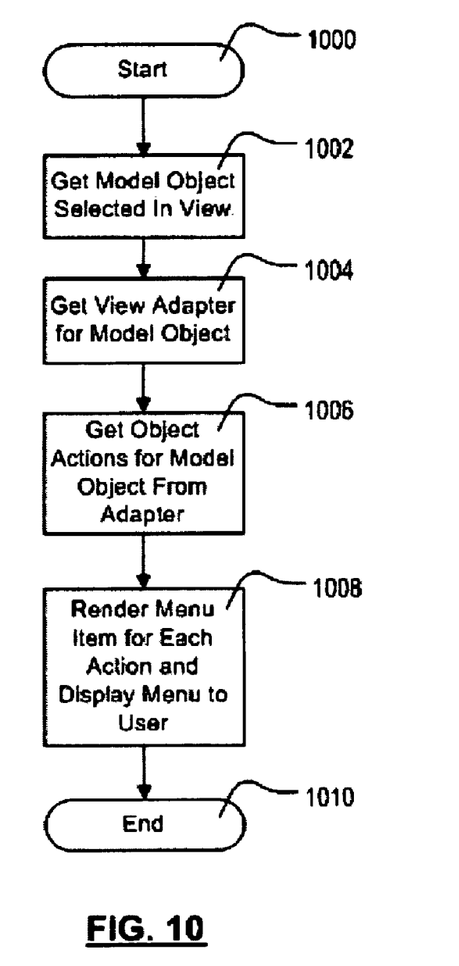
FIG. 10 is a flowchart illustrating operational steps involved in enabling a context menu to provide actions associated with objects of the integrated window.

FIG. 10 is a flowchart illustrating operations involved in enabling the context menu to provide actions associated with objects of the integrated window 308. As is described above, the ICS 306 is enabled to provide a number of standard GUI options such as pop-up menus. An example of such menus is illustrated in FIG. 5. Typically, a menu 504 can be displayed by a user interaction with the view, for example, pointing a pointer 418 to an object in the output pane 404 and clicking a right mouse button. It should be understood by a person skilled in the art that the above described procedure of displaying pop-up menus is exemplary only and different buttons, key clicks, etc. may be used to display pop-up menus and invoke actions with different pointing devices.

On selecting a displayed representation for an object (Step 1000), ICS 306 obtains a model object of the selected object (Step 1002) and a view adapter (not shown) is obtained for the model object (Step 1004). A menu 504 is then rendered and displayed to the user. The displayed menu comprises one or more options, each of these being associated with actions that can be performed for the selected object 502. A displayed menu 504 can also have submenus associated with specific actions, such as submenu menu 508 illustrated in FIG. 5. For example, for a file or folder object, a user may right mouse click on the display representing the object and see a menu of options that may be selected and invoked to manipulate the object. Options may include "open file with" "compile with" or "send to", among others. For generic command objects such as a compile output error with a line number and optionally a column, the display for the object may offer the action option of "open file with editor" to open the source file that was compiled and jump to the line and optionally the column of the file associated with the error.

The system and method for providing an object-oriented graphical integrated command shell in accordance with the present invention serves to integrate a command shell adapted to execute textual commands into a graphical user interface. The graphical user interface running in a software execution environment such as an operating system adapted to receive textual commands for execution and to display textual output resulting from executing commands, interprets the displayed textual output in order to associate these textual commands with model objects that exist within the graphical user interface.

It will be appreciated that modifications and extensions to the embodiments described may be made without departing from the scope of the invention. For example, it is described that given the information interpreted from line of output from the command shell, it is possible to map the line of output to either a generic output model object, or some other model such as a file subsystem. The mappings between output lines and external models may be done via a form of registration. A program interface or other type of extension mechanism may be provided so that a model object could be registered against a line output type. When a line of output is of the appropriate type, an instance of the registered model object is created instead of a generic output model object. By way of further example, the file subsystem could register its file system model object with line output objects of type "file". Because file system model objects are created, all of the rich UI actions and properties that are specific to the file system model object become available from the command shell table view widget that displays such objects. For another line output type such as "error", a build model error object could be registered so that all the behaviours of build model error objects are made available for such objects in the command shell view. The method of registering model objects against line output types lends itself well for product extensibility. In a base product, the command shell support could be made available, and then in some product that builds on top of that base product, a new model could be contributed with objects registered against line output types as an enhancement without requiring any change to the original integrated command shell tool.

The embodiment(s) of the invention described above is (are) intended to be exemplary only. The scope of the invention is therefore intended to be limited solely by the scope of the appended claims.

We claim:

1. A method for integrating a command shell into a graphical user interface (GUI), the command shell for executing commands in a working directory and providing text-based output responses generated in response to executing the commands, said method comprising:

providing a command pane and an output pane in the GUI on a display, the command pane including a command line for a user to enter a shell command to be run in a command shell environment and the output pane including an area in which an output response to the shell command is displayed;

enabling a user to enter a shell command at the command line for execution;

displaying, in the output pane, a text-based path indication of a current working directory and a text-based indication of the shell command entered at the command line;

listening, by a standard output listener and a standard error listener for a text-based output response generated by the execution of the shell command, the standard error listener for listening for the text-based output response on a standard error output stream of the command shell environment and the standard output listener for listening for the text-based output response on a standard output stream of the command shell environment;

responsive to detecting by at least one of the standard output listener and the standard error listener that at least one of the standard error output stream and the standard output stream comprises the text-based output response, retrieving the text of the shell command and determining a type of command from among a plurality of types of commands within the text of the shell command;

retrieving by at least one of the standard output listener and the standard error listener the text-based output response from at least one of the standard error output stream and the standard output stream, in response to the execution of the shell command, the text-based output response including at least one line of text;

interpreting the at least one line of text based on a particular pattern specified for the type of command and in response to the text-based output response matching a file type within the particular pattern, classifying the at least one line of text with at least one file type attribute and extracting at least one portion of the at least one line of text mapped to at least one file as at least one file attribute;

responsive to the at least one line of text being classified with the file type attribute, creating at least one output object for the at least one line of text populated with at least one model object for the GUI that maps to the at least one file attribute in the current working directory;

responsive to the at least one line of text not being classified with the file type attribute, creating the at least one output object for the at least one line of text populated with at least one generic object;

displaying at least one icon and the at least one line of text associated with the at least one output object in the output pane; and responsive to a user selecting the at least one icon by pointing a pointer on the at least one icon in the output pane, displaying a menu comprising at least one selectable option, each at least one selectable option associated with at least one action for performing on the at least one output object associated with the selected at least one icon.

2. The method claimed in claim 1, further comprising:

determining whether the shell command is a change directory command;

responsive to determining the shell command is a change directory command, writing a command to echo the current working directory path to produce the text-based output response comprising a prompt with the current working directory path;

responsive to the at least one line of text not being classified with the file type attribute, detecting whether the at least one line of text is the prompt; and responsive to detecting the at least one line of text is the prompt, updating the current working directory.

3. The method claimed in claim 1, wherein interpreting the at least one line of text based on a particular pattern specified for the type of command, further comprises:

responsive to the text-based output response matching a search type or compile type within a separate pattern for the search or compile type of command from among the plurality of types of commands, extracting at least one portion of the at least one line of text representing at least one of a file name and a line number and storing the file name as a file name attribute and the line number as a line number attribute; and wherein responsive to the at least one line of text not being classified with the file type attribute, creating the at least one output object for the at least one line of text populated with at least one generic object further comprises:

storing at least one of the file name attribute and the line number attribute to the at least one output object.

4. The method claimed in claim 1, wherein responsive to the at least one line of text being classified with the file type attribute, creating at least one output object for the at least one line of text populated with at least one model object for the GUI that maps to the at least one file attribute in the current working directory further comprises:

interpreting the at least one line of text using the current working directory to determine complete paths to files and folders to access the at least one model object for the at least one file attribute.

5. The method claimed in claim 1, further comprising invoking a selected one of said at least one action in response to a further user interaction.

6. A computer program product having a removable recordable medium tangibly embodying code instructions to integrate a command shell of a program into a graphical user interface (GUI) when processed by a processor, the command shell for executing commands in a working directory and providing text-based output responses generated in response to executing the commands, said code instructions comprising:

code instructions for providing a command pane and an output pane in the GUI on a display, the command pane including a command line for a user to enter a shell command to be run in a command shell environment and the output pane including an area in which an output response to the shell command is displayed;

code instructions for enabling a user to enter a shell command at the command line for execution;

code instructions for displaying, in the output pane, a text-based path indication of a current working directory and a text-based indication of the shell command entered at the command line;

code instructions for listening, by a standard output listener and a standard error listener for a text-based output response generated by the execution of the shell command, the standard error listener for listening for the text-based output response on a standard error output stream of the command shell environment and the standard output listener for listening for the text-based output response on a standard output stream of the command shell environment;

code instructions for retrieving the text of the shell command and determining a type of command from among a plurality of types of commands within the text of the shell command, responsive to detecting by at least one of the standard output listener and the standard error listener that at least one of the standard error output stream and the standard output stream comprises the text-based output response;

code instructions for retrieving by at least one of the standard output listener and the standard error listener the text-based output response from at least one of the standard error output stream and the standard output stream, in response to the execution of the shell command, the text-based output response including at least one line of text;

code instructions for interpreting the at least one line of text based on a particular pattern specified for the type of command and in response to the text-based output response matching a file type within the particular pattern, classifying the at least one line of text with at least one file type attribute and extracting at least one portion of the at least one line of text mapped to at least one file as at least one file attribute;

code instructions for creating at least one output object for the at least one line of text populated with at least one model object for the GUI that maps to the at least one file attribute in the current working directory, responsive to the at least one line of text being classified with the file type attribute;

code instructions for creating the at least one output object for the at least one line of text populated with at least one generic object, responsive to the at least one line of text not being classified with the file type attribute;

code instructions for displaying at least one icon and the at least one line of text associated with the at least one output object in the output pane; and code instructions for displaying a menu comprising at least one selectable option, each at least one selectable option associated with at least one action for performing on the at least one output object associated with a selected at least one icon, responsive to a user selecting the at least one icon by pointing a pointer on the at least one icon in the output pane.

7. The computer program product claimed in claim 6, wherein the code instructions further comprise:

code instructions for determining whether the shell command is a change directory command;

code instructions, responsive to determining the shell command is a change directory command, for writing a command to echo the current working directory path to produce the text-based output response comprising a prompt with the current working directory path;

code instructions, responsive to the at least one line of text not being classified with the file type attribute, for detecting whether the at least one line of text is the prompt; and code instructions, responsive to detecting the at least one line of text is the prompt, for updating the current working directory.

8. The computer program product claimed in claim 6, wherein the code instructions for interpreting the at least one line of text based on a particular pattern specified for the type of command, further comprise:

code instructions, responsive to the text-based output response matching a search type or compile type within a separate pattern for the search or compile type of command from among the plurality of types of commands, for extracting at least one portion of the at least one line of text representing at least one of a file name and a line number and storing the file name as a file name attribute and the line number as a line number attribute; and wherein the code instructions responsive to the at least one line of text not being classified with the file type attribute, for creating the at least one output object for the at least one line of text populated with at least one generic object further comprise:

code instructions for storing at least one of the file name attribute and the line number attribute to the at least one output object.

9. The computer program product claimed in claim 6, wherein the code instructions for creating at least one output object for the at least one line of text populated with at least one model object for the GUI that maps to the at least one file attribute in the current working directory, responsive to the at least one line of text being classified with the file type attribute, further comprises:

code instructions for interpreting the at least one line of text using the current working directory to determine complete paths to files and folders to access the at least one model object for the at least one file attribute.

10. The computer program product claimed in claim 6, further comprising code instructions for invoking a selected one of said at least one action in response to a further user interaction.

11. A system to integrate a command shell of a program into a graphical user interface (GUI), the command shell for executing commands in a working directory and providing text-based output responses generated in response to executing the commands, said system comprising:

at least one storage device storing code instructions; and a processor, wherein the code instructions, which when executed by the processor, cause the processor:

to provide a command pane and an output pane in the GUI on a display, the command pane including a command line for a user to enter a shell command to be run in a command shell environment and the output pane including an area in which an output response to the shell command is displayed;

to enable a user to enter a shell command at the command line for execution, to display, in the output pane, a text-based path indication of a current working directory and a text-based indication of the shell command entered at the command line;

to listen, by a standard output listener and a standard error listener for a text-based output response generated by the execution of the shell command, the standard error listener for listening for the text-based output response on a standard error output stream of the command shell environment and the standard output listener for listening for the text-based output response on a standard output stream of the command shell environment;

to retrieve the text of the shell command and determining a type of command from among a plurality of types of commands within the text of the shell command, responsive to detecting by at least one of the standard output listener and the standard error listener that at least one of the standard error output stream and the standard output stream comprises the text-based output response;

to retrieve by at least one of the standard output listener and the standard error listener the text-based output response from at least one of the standard error output stream and the standard output stream, in response to the execution of the shell command, the text-based output response including at least one line of text;

to interpret the at least one line of text based on a particular pattern specified for the type of command and in response to the text-based output response matching a file type within the particular pattern, classifying the at least one line of text with at least one file type attribute and extracting at least one portion of the at least one line of text mapped to at least one file as at least one file attribute;

to create at least one output object for the at least one line of text populated with at least one model object for the GUI that maps to the at least one file attribute in the current working directory, responsive to the at least one line of text being classified with the file type attribute;

to create the at least one output object for the at least one line of text populated with at least one generic object, responsive to the at least one line of text not being classified with the file type attribute;

to display at least one icon and the at least one line of text associated with the at least one output object in the output pane; and to display a menu comprising at least one selectable option, each at least one selectable option associated with at least one action for performing on the at least one output object associated with a selected at least one icon, responsive to a user selecting the at least one icon by pointing a pointer on the at least one icon in the output pane.

12. The system claimed in claim 11, the processor further executing the code instructions:

to determine whether the shell command is a change directory command and responsive to determining the shell command is a change directory command, to write a command to echo the current working directory path to produce the text-based output response comprising a prompt with the current working directory path;

to detect whether the at least one line of text is the prompt, responsive to the at least one line of text not being classified with the file type attribute; and to update the current working directory, responsive to detecting the at least one line of text is the prompt.

13. The system claimed in claim 11, wherein the code instructions to interpret the at least one line of text based on a particular pattern specified for the type of command, further comprise:

code instructions responsive to the text-based output response matching a search type or compile type within a separate pattern for the search or compile type of command from among the plurality of types of commands, to extract at least one portion of the at least one line of text representing at least one of a file name and a line number and storing the file name as a file name attribute and the line number as a line number attribute; and wherein the code instructions to create the at least one output object for the at least one line of text populated with at least one generic object further comprises:

code instructions to store at least one of the file name attribute and the line number attribute to the at least one output object.

14. The system claimed in claim 11, wherein the code instructions to create at least one output object for the at least one line of text populated with at least one model object for the GUI that maps to the at least one file attribute in the current working directory, responsive to the at least one line of text being classified with the file type attribute, further comprises:

code instructions to interpret the at least one line of text using the current working directory to determine complete paths to files and folders to access the at least one model object for the at least one file attribute.

15. The system claimed in claim 11, further comprising processing the code instructions to invoke a selected one of said at least one action in response to a further user interaction.

* * * * *

UNITED STATES PATENT AND TRADEMARK OFFICE
CERTIFICATE OF CORRECTION

PATENT NO. : 7,627,833 B2
APPLICATION NO. : 10/702993
DATED : December 1, 2009
INVENTOR(S) : McKnight et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1060 days.

Signed and Sealed this

Second Day of November, 2010

David J. Kappos
*Director of the United States Patent and Trademark Office*